United States Patent Office 2,939,896
Patented June 7, 1960

2,939,896
ISOMERIZATION PROCESS AND CATALYST

John W. Myers, Bartlesville, Okla., assignor to Phillips Petroleum Company, a corporation of Delaware No Drawing. Filed Dec. 9, 1957, Ser. No. 701,354

5 Claims. (Cl. 260—683.68)

This invention relates to an improved isomerization process employing as catalyst a platinum-halogen-alumina catalyst containing sulfate.

In the catalytic isomerization of paraffinic hydrocarbons employing platinum-halogen-alumina catalysts of the prior art, difficulty has been encountered with a tendency of the catalyst to promote an initial temperature runaway, with consequent shortening of the catalyst life and activity because of high carbon deposition and excessive temperatures.

An object of the invention is to provide an improved paraffin isomerization process. Another object of the invention is to minimize the initial temperature rise when isomerizing a paraffin over a platinum-halogen-alumina catalyst.

Other objects, as well as aspects and advantages, of the invention will become apparent upon a study of the accompanying disclosure.

According to the invention, there is provided an improved isomerization process which comprises isomerizing paraffins in the presence of added hydrogen over a catalyst containing from 0.01 to 5 weight percent platinum, from 0.05 to 8 weight percent total halogen, said halogen being at least one of the halogens selected from the group consisting of chlorine and fluorine, at least 0.2 weight percent, preferably 0.2 to 1 weight percent, sulfate ion in the form of a sulfate of aluminum, zirconium or magnesium, all deposited on an activated alumina having a surface area of at least 50 square meters per gram, said catalyst being calcined in a non-reducing atmosphere prior to said isomerization.

Although the percentages of constituents in the catalyst useful according to the invention are the percentages given in the foregoing paragraph, it is preferred that the catalyst contain platinum in the range from 0.1 to 1 weight percent, halogen in the range from 1 to 5 weight percent, and sulfate ion of at least 0.5 weight percent.

The catalyst can be prepared in any suitable manner. One method of preparation comprises impregnating an activated alumina with an aqueous solution of a sulfate of aluminum, zirconium or magnesium. The sulfate impregnated alumina base is then dried, usually at a temperature in the range from 215 to 275° F. The catalyst can then be impregnated by contacting with a fluorine compound which will react with the base, such as gaseous or aqueous hydrogen fluoride or an aqueous solution of ammonium fluoride. The impregnated catalyst is then heated to a temperature usually in the range from 215 to 275° F. to remove volatile matter and/or water. The catalyst can then be impregnated with a chloroplatinic acid solution, then dried and calcined in a non-reducing atmosphere at a temperature in the range from 500 to 1000° F. for a period of at least one-half hour.

No particular order of addition of the various ingredients of the catalyst is necessary, although it is convenient to add the sulfate before adding the platinum. The calcining step is effected in a non-reducing atmosphere, such as in air or an inert atmosphere such as nitrogen at a temperature in the range from 500 to 1000° F. for at least one-half hour, usually from 1 to 30 hours. The catalyst can also then be subjected to limited heating in an atmosphere containing hydrogen for a period of not over 8 hours at a temperature in the range from 500 to 1000° F., if desired.

Under the foregoing conditions of catalyst preparation when using a sulfate of aluminum, zirconium, or magnesium, the sulfate in the catalyst will not be decomposed to a form such that the catalyst is denuded of sulfur.

The feed hydrocarbons to the isomerization process according to this invention contain at least 90 percent paraffin hydrocarbons containing from 4 to 12 carbon atoms. The paraffin hydrocarbons can be mixtures of paraffin hydrocarbons or predominantly only one paraffin hydrocarbon. The paraffin hydrocarbon feed employed in the isomerization process of the invention contains at least one paraffin selected from the group consisting of normal paraffins having from 4 to 12 carbon atoms, usually 5 to 8 carbon atoms, to the molecule and singly branched paraffins having from 5 to 12 carbon atoms, preferably from 6 to 8 carbon atoms, to the molecule. The isomerization is effected at temperatures in the range of from 600 to 900° F., preferably from 725 to 850° F., pressures of at least 100 p.s.i.a., preferably from 200 to 1000 p.s.i.a., liquid hourly spaced velocities of from .5 to 10, and a mole ratio of added hydrogen to hydrocarbon feed in the range from 1:1 to 10:1.

Examples of paraffin hydrocarbons which can be isomerized according to the invention are n-butane, n-pentane, n-hexane, n-heptane, n-octane, n-nonane, n-decane, n-undecane, n-dodecane, isopentane, 2-methylpentane, 3-methylpentane, 3-methylhexane, 2-methylheptane, 2-ethylpentane, 3-ethyloctane, 3-propylhexane, 4-ethylnonane, 2-methylnonane, 5-ethyldecane, 3-methylundecane, and 4-butyloctane.

The catalyst of the present invention enables the process to be started with a new catalyst without the difficulty of initial temperature runaway, thus avoiding impairing catalyst life and activity because of undue carbon deposition and excessive temperatures. After initial start up has been accomplished, the catalysts of the present invention effect the isomerization reaction with higher efficiency than similar catalyst not having sufficient sulfate.

The following examples are illustrative embodiments of the invention and show advantages of the present process when compared with similar catalysts deficient in sulfate.

EXAMPLE I

The tests in Example I illustrate the higher efficiency of conversion of normal pentane to isopentane. The catalyst compositions in this example, given in weight percent and on an alumina base, are as follows:

|  | Runs 1 and 2 | Run 3 |
|---|---|---|
| Platinum | 0.4 | 0.4 |
| Fluorine | 2.8 | 2.8 |
| Chlorine | 0.2 | 0.2 |
| Sulfate ion | 0.5 | 0.1 |

The catalyst for Run 1 was prepared by adding 61.1 grams of activated alumina (in the form of 1/8 th x 1/8 th inch cylindrical pills) containing aluminum sulfate incorporated therein to an impregnating solution prepared by mixing 5.19 grams of 48 percent aqueous HF, 71 milliliters of distilled water, and 24 milliliters of chloroplatinic acid containing 3.5 grams of acid in 100 milliliters of solution. After standing (with occasional agitation) for 26 minutes, the catalyst was drained, dried at 225° F. and further heat-treated by heating in air from 210 to 750° F. in about 2 and one-half hours. Before use in the isomerization reaction, the catalyst was heated to about 800° F. in an atmosphere of hydrogen.

The catalyst for Run 2 was prepared by adding 254.9 grams of alumina in the form of ⅛th x ⅛th inch cylindrical pills containing aluminum sulfate incorporated therein to an impregnating solution prepared by mixing 22.8 grams of 48 percent aqueous HF, 290 milliliters of distilled water, and 100 milliliters of chloroplatinic acid solution containing 3.5 grams of acid. After standing (with occasional agitation) for 45 minutes, the catalyst was drained, dried at 225° F., and further heat-treated by heating from 150 to 810° F. in about 4 hours. Prior to use in Run 2, the catalyst was heated up to reaction temperature up to about 800° F. by heating in hydrogen.

The catalyst for Run 3 was prepared by treating 52.1 grams of alumina, in the form of ⅛th x ⅛th inch cylindrical pills, containing aluminum sulfate incorporated therein, with distilled water to extract sulfate and thereby reduce the sulfate content to 0.1 weight percent. The alumina was then added to impregnating solution prepared by mixing 5.21 grams of 48 percent aqueous HF, 71 milliliters of distilled water, and 24 milliliters of chloroplatinic acid containing 3.5 grams of acid in 100 milliliters of solution. After standing (with occasional agitation) for 28 minutes, the catalyst was drained, dried at 225° F., and further heat treated by heating from room temperature to 279° F. in about 5 hours. Prior to use in Run 3, the catalyst was heated up in an atmosphere of hydrogen. Table I shows the process conditions and results.

*Table I*

|  | Run 1 | Run 2 | Run 3 |
|---|---|---|---|
| $SO_4^=$ Content, wt. percent | 0.5 | 0.5 | 0.1 |
| Process Conditions: |  |  |  |
| Temperature, ° F | 799 | 810 | 807 |
| Pressure, p.s.i.g | 600 | 600 | 600 |
| LHSV | 2.1 | 2.1 | 2.1 |
| $H_2$/pentane, mol ratio | 2.1 | 2.4 | 2.2 |
| Product Yields, wt. percent: |  |  |  |
| $CH_4$ | 0.2 | 0.3 | 2.2 |
| $C_2H_6$ | 0.2 | 0.5 | 3.4 |
| $C_3H_8$ | 0.3 | 0.7 | 5.6 |
| $iC_4H_{10}$ | 0.1 | 0.3 | 2.5 |
| $nC_4H_{10}$ | 0.5 | 0.9 | 5.8 |
| $iC_5H_{12}$ | 58.6 | 60.0 | 49.9 |
| $nC_5H_{12}$ | 40.1 | 37.3 | 30.6 |
| Total | 100.0 | 100.0 | 100.0 |

It will be seen that the catalyst containing a lower amount of sulfate than the catalyst of the invention (Run 3) gave much less efficient isomerization.

EXAMPLE II

In the runs in this example, the maximum temperature during start-up in each run was recorded. The catalyst employed in Run 4 was the same catalyst as that employed in Run 1. The pretreatment with hydrogen was effected until the catalyst had reached a temperature of 789° F. The catalyst in Run 5 was a commercial catalyst containing no sulfate but containing 0.4 weight percent platinum, 0.3 weight percent chlorine and 0.3 weight percent fluorine on alumina. Table II shows the conditions of each run and the maximum temperature during start-up.

*Table II*

|  | Run 4 | Run 5 |
|---|---|---|
| Pressure, p.s.i.g | 600 | 200 |
| LHSV | 2.0 | 2.9 |
| Hydrogen/pentane, mol ratio | 2.4 | 3.0 |
| Temperature, ° F., before starting pentane | 789 | 825 |
| Maximum Temperature noted, ° F., after starting pentane | 798 | 1,020 |

In isomerizing a paraffin to a more highly branched paraffin with a platinum-halogen-alumina catalyst containing no soluble sulfate there is a sharp temperature rise on initial start-up as is illustrated by Run 5. On the other hand, as shown by Run 4, catalyst containing appreciable sulfate in the range according to the invention greatly minimized the temperature rise on the initial start-up.

The higher pressure of Run 4 accentuates any temperature increase. Thus, the temperature in this case would have been even less if it had been run at the same pressure as Run 5.

As will be evident to those skilled in the art, various modifications of this invention can be made or followed in the light of the foregoing disclosure and discussion without departing from the spirit or scope of the disclosure or from the scope of the claims.

I claim:
1. A method of isomerizing a paraffin hydrocarbon containing from 4 to 12 carbon atoms per molecule to a more highly branched paraffin hydrocarbon which comprises charging a catalyst and a hydrocarbon feed comprising at least 90 weight percent of paraffin hydrocarbons containing at least one paraffin hydrocarbon selected from the group consisting of normal paraffins containing from 4 to 12 carbon atoms and singly branched paraffins containing from 5 to 12 carbon atoms per molecule, contacting said hydrocarbon feed with said catalyst in said contacting zone under isomerizing conditions in the presence of added hydrogen in the mole ratio of hydrogen to hydrocarbon feed of from 1:1 to 10:1, said catalyst comprising from 0.01 to 5 weight percent platinum, from 0.05 to 8 weight percent total halogen, said halogen being at least one of the halogens selected from the group consisting of chlorine and fluorine, and from 0.2 to 1 weight percent sulfate ion in the form of a sulfate of a metal selected from the group consisting of aluminum, zirconium, and magnesium, all deposited on an activated alumina, said catalyst being calcined in a non-reducing atmosphere prior to said isomerization.

2. A process according to claim 1 wherein said catalyst contains platinum in the range from 0.1 to 1 weight percent and halogen in the range from 1 to 5 weight percent.

3. A process according to claim 1 wherein said sulfate is aluminum sulfate.

4. A process according to claim 1 wherein said paraffin hydrocarbon is normal pentane.

5. A process according to claim 4 wherein said sulfate is aluminum sulfate.

References Cited in the file of this patent

UNITED STATES PATENTS

| 2,550,531 | Ciapetta | Apr. 24, 1951 |
| 2,732,329 | Doumani | Jan. 24, 1956 |
| 2,766,302 | Elkins | Oct. 9, 1956 |
| 2,834,823 | Patton et al. | May 13, 1958 |

FOREIGN PATENTS

| 487,392 | Canada | Oct. 21, 1952 |

OTHER REFERENCES

Sachanen: "Conversion of Petroleum," 2nd ed. page 400, Reinhold Pub. Corp., 1948.